United States Patent
Brown et al.

(10) Patent No.: US 11,867,849 B2
(45) Date of Patent: Jan. 9, 2024

(54) SONAR DISPLAY FOR DISPLAYING UNDERWATER IMAGE STREAMS FROM MULTIPLE SONAR TRANSDUCERS

(71) Applicant: Garmin International, Inc., Olathe, KS (US)

(72) Inventors: Kevin A. Brown, Broken Arrow, OK (US); Nathan R. Memmott, Tulsa, OK (US); Aaron R. Coleman, Broken Arrow, OK (US); Gregory M. Groener, Overland Park, KS (US)

(73) Assignee: Garmin International, Inc., Olathe, KS (US)

( * ) Notice: Subject to any disclaimer, the term of this patent is extended or adjusted under 35 U.S.C. 154(b) by 255 days.

(21) Appl. No.: 17/480,957

(22) Filed: Sep. 21, 2021

(65) Prior Publication Data

US 2023/0088987 A1     Mar. 23, 2023

(51) Int. Cl.
| | | |
|---|---|---|
| *G01S 7/56* | (2006.01) | |
| *G01S 15/89* | (2006.01) | |
| *G01S 15/93* | (2020.01) | |
| *G06F 3/14* | (2006.01) | |

(52) U.S. Cl.
CPC ............... *G01S 7/56* (2013.01); *G01S 15/89* (2013.01); *G01S 15/93* (2013.01); *G06F 3/14* (2013.01)

(58) Field of Classification Search
CPC . G01S 7/56; G01S 15/89; G01S 15/93; G06F 3/14
See application file for complete search history.

(56) References Cited

U.S. PATENT DOCUMENTS

| | | |
|---|---|---|
| 9,664,783 B2 | 5/2017 | Brown et al. |
| 9,784,825 B2 | 10/2017 | Brown et al. |
| 2014/0010049 A1* | 1/2014 | Proctor .................. G01S 15/86 367/88 |
| 2016/0245915 A1* | 8/2016 | Clark ..................... G01S 7/6281 |
| 2018/0217244 A1* | 8/2018 | Coleman ............... G01S 7/6263 |
| 2020/0072953 A1 | 3/2020 | Wigh et al. |
| 2022/0268926 A1* | 8/2022 | Hooper .................. G01S 7/521 |

OTHER PUBLICATIONS

Garmin GPSMAP® Owner's Manual 7x2, 9x2, 12x2 Touch, A12, 7x2 Plus, 9x2 Plus, 12x2 Plus, 7x3, 9x3, 12x3, https://www8.garmin.com/manuals/webhelp/gpsmap_touch/EN-US/GPSMAP_Touch_OM_EN-US.pdf published 2019.

* cited by examiner

*Primary Examiner* — Hongmin Fan
(74) *Attorney, Agent, or Firm* — Samuel M. Korte; Max M. Ali

(57) ABSTRACT

A sonar display comprises a processing element and a display. The processing element is configured to receive a first sonar electronic signal from a first sonar transducer, receive a second sonar electronic signal from a second sonar transducer, generate data for a first underwater image stream from the first sonar electronic signal and a second underwater image stream from the second sonar electronic signal. The display is configured to show at least one of the first underwater image stream having a first view derived from reflections of a first sonar beam, the second underwater image stream having a second view derived from reflections of a second sonar beam, and an indication of a position of the first sonar beam relative to the second sonar beam.

20 Claims, 6 Drawing Sheets

SONAR DISPLAY FOR DISPLAYING
UNDERWATER IMAGE STREAMS FROM
MULTIPLE SONAR TRANSDUCERS

BACKGROUND

Sonar displays are utilized with a marine vessel on a body of water to view one or more underwater image streams of objects that are in the water around the marine vessel. Typically, the underwater image streams are shown on the display simultaneously, with each underwater image stream being shown on a separate section of the display. The underwater image streams may have one of a plurality of view points. In an exemplary scenario, a user may be able to view objects in the water in a forward direction on one section of the display and objects in the water from a perspective view on another section of the display.

SUMMARY

Embodiments of the present technology provide a sonar display with improved performance that gives the user an indication of the relationship between the view of the one underwater image stream and the view of the other underwater image stream. The sonar display broadly comprises a processing element and a display. The processing element is configured and/or programmed to receive a first sonar electronic signal from a first sonar transducer, receive a second sonar electronic signal from a second sonar transducer, generate data for a first underwater image stream from the first sonar electronic signal, and generate data for a second underwater image stream from the second sonar electronic signal. The display is configured to show at least one of the first underwater image stream having a first view derived from reflections of a first sonar beam, the second underwater image stream having a second view derived from reflections of a second sonar beam, and an indication of a position of the first sonar beam relative to the second sonar beam. The processing element controls the display to present the first underwater image stream, the second underwater image stream, and the indication.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
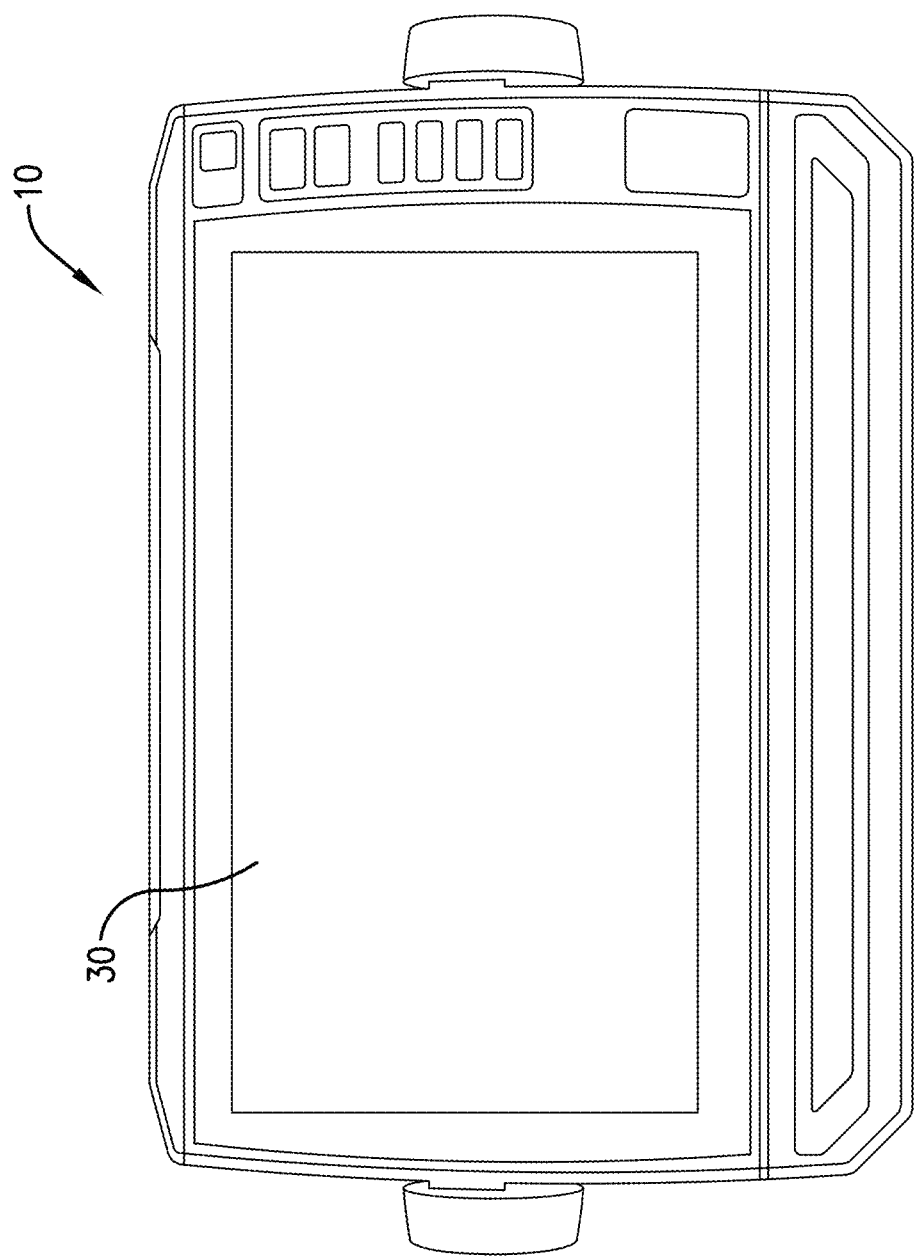
FIG. 1 is a front view of a sonar display, constructed in accordance with various embodiments of the current technology.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Relational terms, such as "above", "below", "over", "beneath", "upper", "upward", "lower", "downward", "top", "bottom", "outer", "inner", etc., may be used throughout this description. These terms are used with reference to embodiments of the technology and the orientations and relative positionings of the components thereof shown in the accompanying figures. Embodiments of the technology may be oriented and/or positioned in ways other than those shown in the figures. Therefore, the terms do not limit the scope of the present technology.

Embodiments of the present technology relate to a sonar display for use with a marine vessel on a body of water. Generally, sonar displays are utilized to view one or more underwater image streams, i.e., moving images, of objects that are in the water around the marine vessel. Typically, the underwater image streams are shown on the display simultaneously, with each underwater image stream being shown on a separate section of the display. The underwater image streams may have one of a plurality of view points. For example, a first underwater image stream may have a forward view that looks at a vertical slice of the water in front of the marine vessel. A second underwater image stream may have a perspective view that looks at a horizontal slice of the water in front of the marine vessel. Each underwater image stream is generated from data derived from electronic signals output by one of a plurality of sonar transducers. That is, the first underwater image stream is generated from data derived from a first sonar transducer, and the second underwater image stream is generated from data derived from a second sonar transducer. Each sonar transducer transmits a sonar beam that reflects off objects in the water and returns to the transducer which outputs the corresponding electronic signal. For example, the first sonar transducer transmits the first sonar beam and outputs a first electronic signal, and the second sonar transducer transmits the second sonar beam and outputs a second electronic signal. Thus in terms of the relationship between the underwater image streams and the sonar beams, the view of the first underwater image stream is the underwater volume covered by the first sonar beam, and the view of the second underwater image stream is the underwater volume covered by the second sonar beam. It often can be difficult for anglers to identify the positional relationship between the displayed image streams.

In an exemplary scenario, the first transducer is positioned to transmit the first sonar beam, which provides the forward view, underneath the second sonar beam, which provides the perspective view. The result would be that the first underwater image stream shows objects in the water underneath a portion of the view of the second underwater image stream. However, the user does not know the angle at which the first sonar beam is pointing, or the position of the first sonar beam, relative to the second sonar beam—meaning the user does not know which portion of the view of the second underwater image stream is shown on the first underwater image stream. The user has the ability, through an interface on the sonar display, to rotate each sonar transducer independently about a vertical axis so that a direction in which each sonar beam is pointed can be changed. Or, in some systems, the user may manually rotate or otherwise position the various sonar transducers in a desired direction or orientation. The user may see an object of interest in a portion of the view of the second underwater image stream. But, he would not know in which direction to rotate the first transducer in order to see the object in the first underwater image stream.

The sonar display of the present technology provides improved performance that allows the user to see an indication that shows the angle at which the first sonar beam is pointed, or the position of the first sonar beam, relative to the second sonar beam, thereby also indicating which portion of the view of the second underwater image stream is shown on the first underwater image stream. Thus, the user would be able to tell in which direction to rotate the first transducer in order to see a given object in the first underwater image stream. Or, inversely, the user would be able to know how to position the second transducer in order to see an object identified by the first transducer.

Furthermore, the sonar display may provide a pictogram which includes a first wedge icon representing the first sonar beam and a second wedge icon representing the second sonar beam 26. The first and second wedge icons are positioned on a polar plot not only at the relative rotation angle of the first and second sonar beams, but also in a geographic direction in which the first and second sonar beams are pointed. This helps the user understand the rotation angle in which both sonar beams are pointed. Of course, the pictogram may be configured in any manner to easily indicate the relative positions of the first and second sonar beams.

Figure 2:
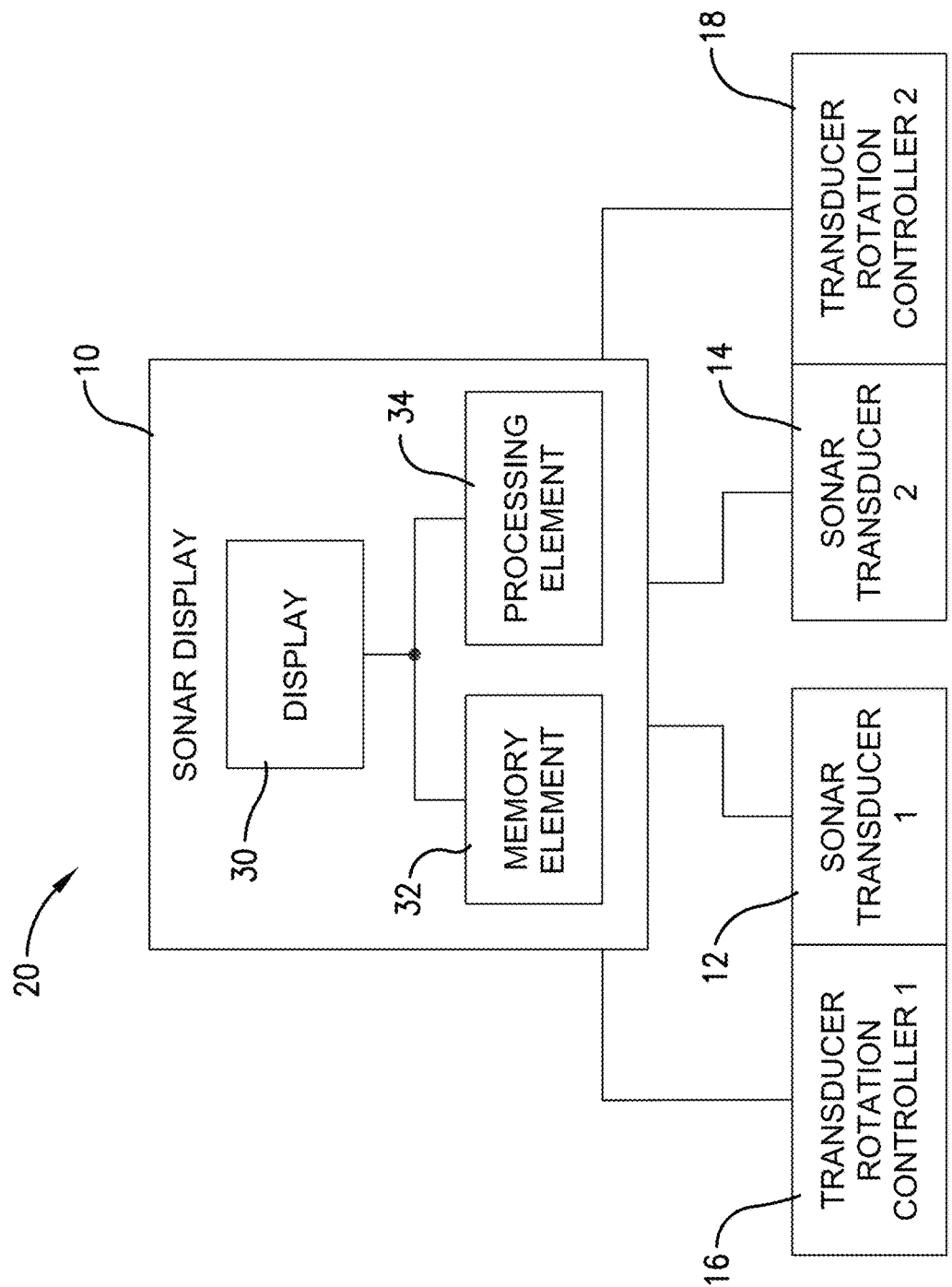
FIG. 2 is a block schematic diagram of components of the sonar display along with additional components that, in combination, form a sonar system.

Embodiments of the technology will now be described in more detail with reference to the drawing figures. Referring initially to FIGS. 1 and 2, a sonar display 10 for displaying a plurality of underwater image streams is illustrated. The sonar display 10 may interface, or be in communication, with a first sonar transducer 12, a second sonar transducer 14, a first transducer rotation controller 16, and a second transducer rotation controller 18. The combination of the sonar display 10 and the listed components forms, at least in part, a sonar system 20. The sonar system 20 may include any number of displays, transducers, and components to provide any combination of sonar functionality and sonar coverage. For instance, in some configurations, three or more transducers may be employed. And, similarly, two or more transducers may be utilized to provide sonar functionality to two or more sonar displays.

Figure 3:
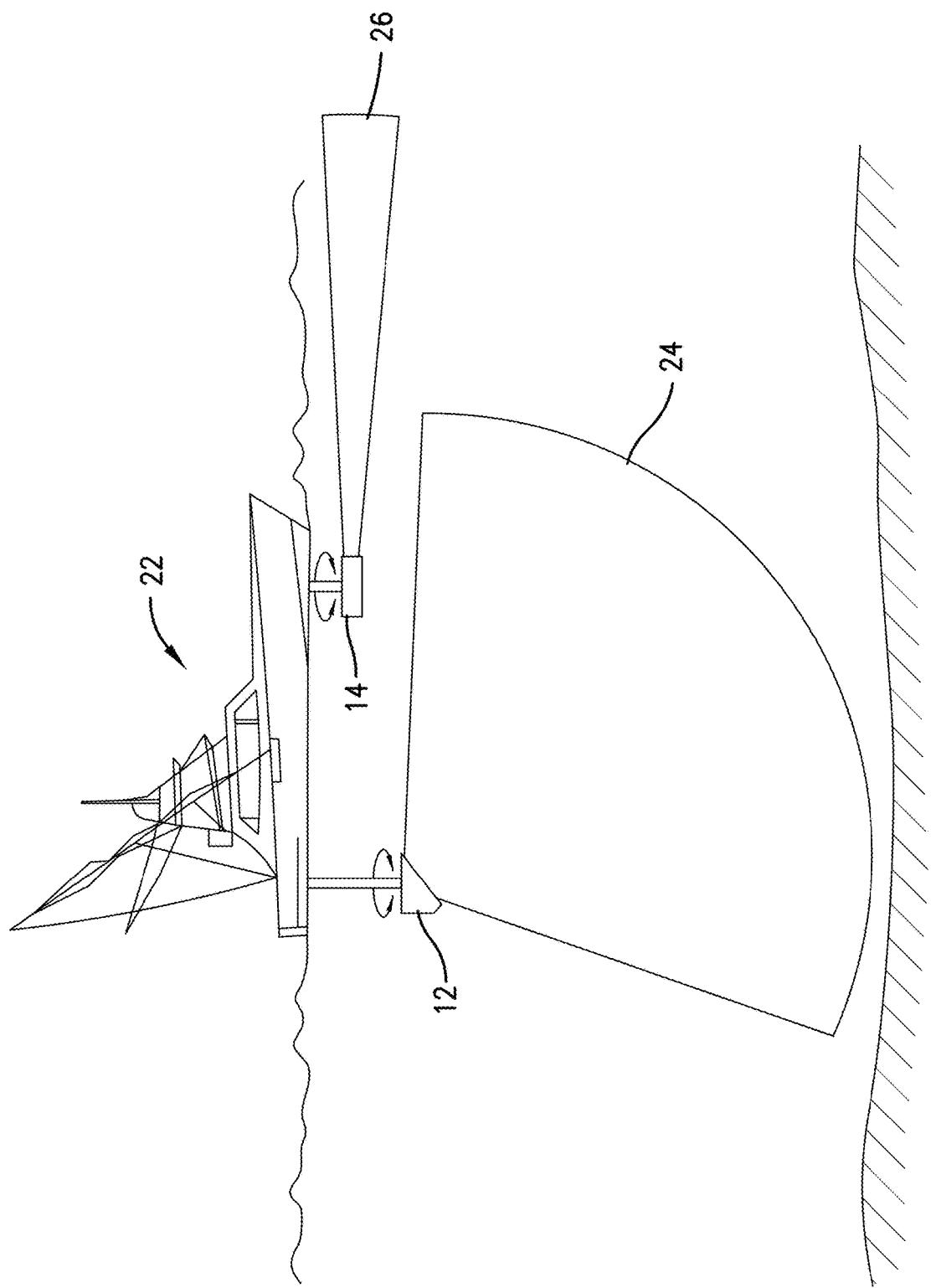
FIG. 3 is a side view of a marine vessel in a body of water, the marine vessel utilizing the sonar system including a first sonar transducer transmitting a first sonar beam and a second sonar transducer transmitting a second sonar beam.
Figure 4:
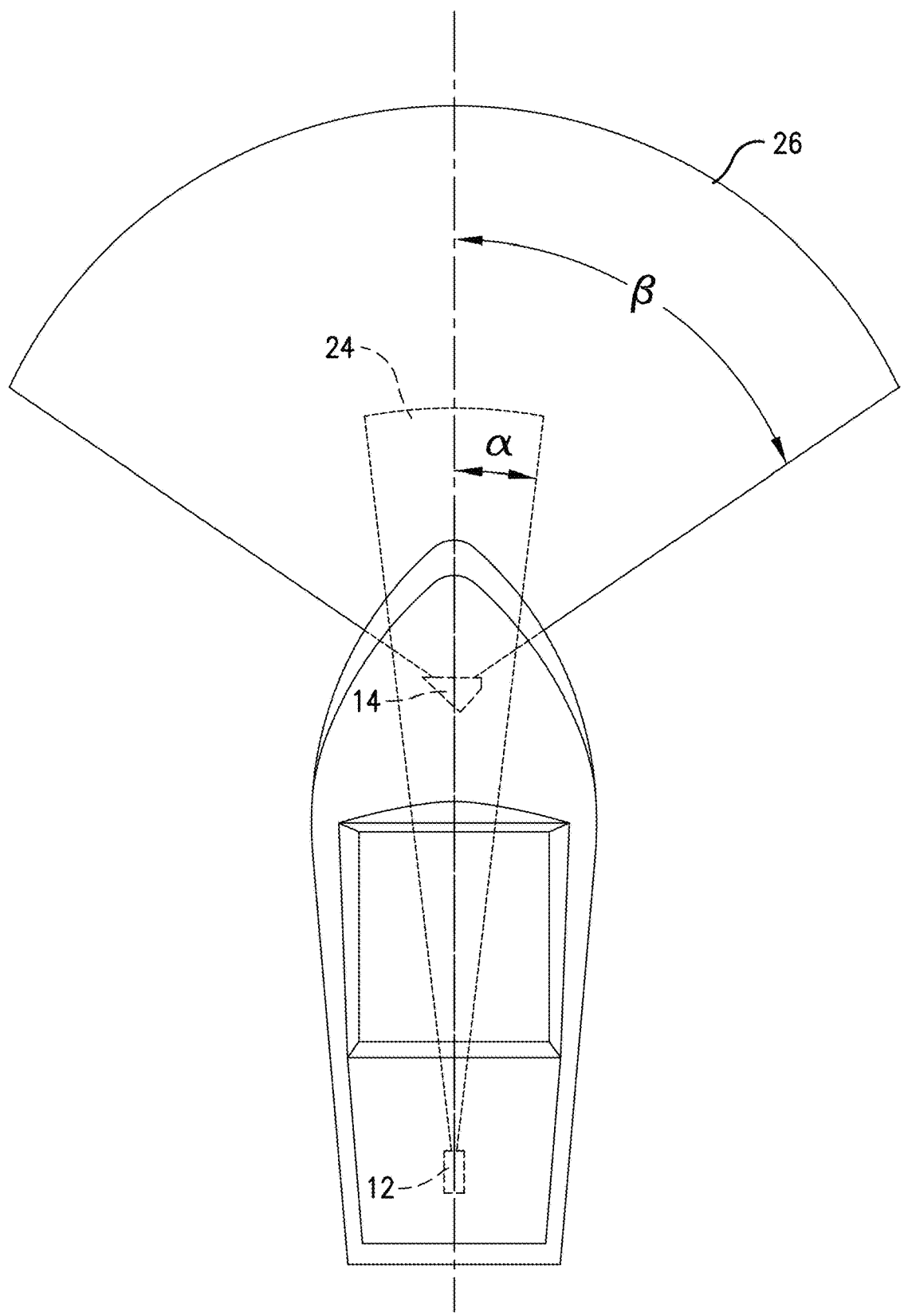
FIG. 4 is a top view of the marine vessel illustrating a first rotation angle of the first sonar beam and a second rotation angle of the second sonar beam.

Referring to FIGS. 3 and 4, the sonar system 20 is utilized with a marine vessel 22 traveling in a body of water. The first sonar transducer 12 transmits a first sonar beam 24, and the second sonar transducer 14 transmits a second sonar beam 26. The first and second sonar beams 24, 26 may have any one of a plurality of shapes. Exemplary first and second sonar beams 24, 26 are wedge shaped, such that along a first dimension, each sonar beam 24, 26 has a beam arc that may span an angle of up to approximately 150 degrees, and along a second dimension orthogonal to the first, each sonar beam 24, 26 has a beam width that may span an angle of up to approximately 20 degrees.

The sonar transducers 12, 14 may be oriented to give the sonar beams 24, 26 that they transmit a particular orientation. For example, the first sonar transducer 12 is oriented to transmit the first sonar beam 24 with a first orientation such that the beam arc is transverse to the surface of the water which forms a forward view of the water beneath and in front of the marine vessel 22. In alternative implementations, the first sonar transducer 12 may be positioned to aim the first sonar beam 24 more downward so that it forms a down view of the water beneath the marine vessel 22. The second sonar transducer 14 is oriented to transmit the second sonar beam 26 with a second orientation such that the beam arc is parallel to the surface of the water which forms a perspective view of the water in front of the marine vessel 22. In other embodiments of the sonar system 20, the first sonar transducer 12 and the second sonar transducer 14 may each be oriented to provide the forward view. The various transducers may be oriented to provide any desired sonar coverage area and any number of transducers, and associated views, may be utilized. For example, transducers 12, 14 may be oriented to provide any combination of forward, down, side, perspective, and other sonar views.

Each of the first sonar transducer 12 and the second sonar transducer 14 may be embodied by one of a plurality of types of transducer that include at least one transducer element. Exemplary embodiments of the first sonar transducer 12 and the second sonar transducer 14 each include a plurality of transducer elements positioned to form an array. In some configurations, transducers 12, 14 are each frequency-steered sonar transducers capable of generating "real time" sonar imagery. However, any transducer technology may be employed, including phased-array systems, scanning systems such as side view and down view systems, and conventional conical beam systems that transform electrical energy from an electronic signal into mechanical or acoustic energy and vice-versa. The combined acoustic energy from the transducer elements forms the sonar beam 24, 26.

Figure 5:
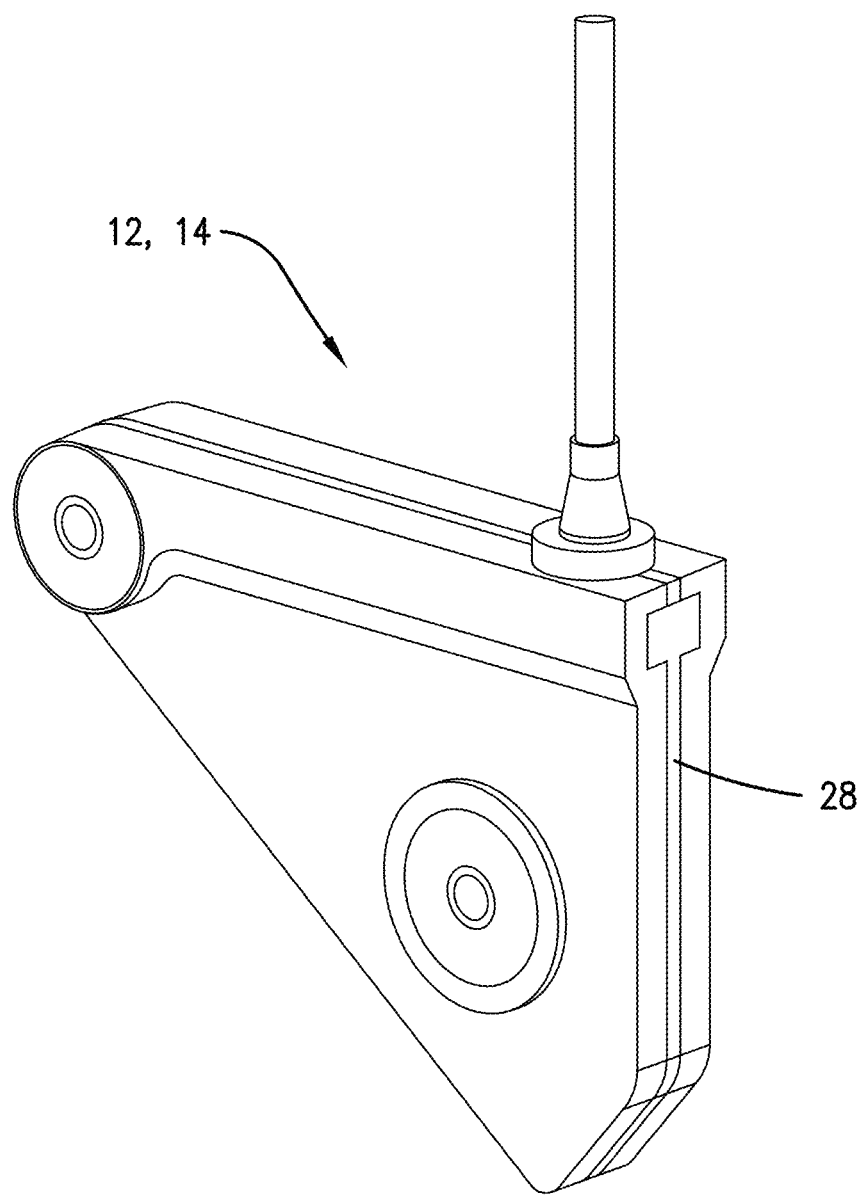
FIG. 5 is an isometric view of one of the sonar transducers.

Referring to FIG. 5, in one example, each sonar transducer 12, 14 includes a housing 28 with a plurality of side walls connected to one another to form a generally right triangle shape, wherein the array of transducer elements is positioned along the side wall that defines a hypotenuse of the triangle. Thus, the sonar beam 24, 26 is transmitted, and reflections are received, through the side wall defining the hypotenuse.

Each sonar transducer 12, 14 may be mounted anywhere on a marine vessel 22 or even configured to be hand-held or pole mounted for ice fishing operations. In the example of FIGS. 3 and 4, transducers 12, and 14 are mounted for discussion purposes to a bottom of the hull of the marine vessel 22. However, the transducers 12, 14 may be mounted to a transom (rear) of the marine vessel 22, on a trolling motor, or on a pole mount extending from the deck of the vessel 22.

The first sonar transducer 12 and the second sonar transducer 14 may be mounted in the same location, with one often being positioned above the other. However, in other embodiments, the transducers 12, 14 are installed at different locations on the marine vessel 22. For example, first sonar transducer 12 may be mounted to a trolling motor installed at the bow of the vessel 22 while second sonar transducer 14 may be installed on the rear transom of the vessel 22. Embodiments of the present invention enable the sonar beams generated from these disparate installations to be easily visualized by the user.

The first sonar transducer 12 may be mechanically coupled to the first transducer rotation controller 16, and the second sonar transducer 14 may be mechanically coupled to the second transducer rotation controller 18. Each transducer rotation controller 16, 18 may include a motor and/or other mechanisms that are configured to control or change a rotation angle of the coupled sonar transducer 12, 14 by physically rotating the sonar transducer 12, 14. For example, the first transducer rotation controller 16 may control a rotation of, or rotate, the first sonar transducer 12, which in turn, controls a first rotation angle $\alpha$ of the first sonar beam 24. The rotation angle $\alpha$ is shown in FIG. 4 as being measured with respect to a reference line, such as a center line of the marine vessel 22. Other reference lines could be utilized. The second transducer rotation controller 18 may control a rotation of, or rotate, the second sonar transducer 14, which in turn, controls a second rotation angle $\beta$ of the second sonar beam 26, as shown in FIG. 4. Each transducer rotation controller 16, 18 may receive a transducer rotation electronic signal which has a variable analog electric voltage or electric current level or digital data value. Each transducer rotation controller 16, 18 rotates its associated sonar transducer 12, 14 by an amount, or angle, that varies according to the analog level or digital data value. Alternatively, each transducer rotation controller 16, 18 rotates its associated sonar transducer 12, 14 to a rotation angle that varies according to the analog level or digital data value. In some configurations, controllers 16, 18 may be manual, mechanical devices such as pole mounts that are physically positioned by the user to orient the transducers 12, 14 in the desired manner.

The first sonar transducer 12 transmits the first sonar beam 24 and the second sonar transducer 14 transmits the second sonar beam 26 each as a result of receiving a transmit electronic signal. For example, the first sonar transducer 12 may receive a first transmit electronic signal, and the second sonar transducer 14 may receive a second transmit electronic signal in order to transmit the sonar beams 24, 26. Alternatively, the first sonar transducer 12 and the second sonar transducer 14 may each receive a plurality of transmit electronic signals in order to transmit the sonar beams 24, 26.

The sonar beams 24, 26 reflect off surfaces, such as the bottom of the body of water, and objects, such as fish and underwater structures, and returns to the sonar transducers 12, 14. As a result of receiving the reflected sonar beam 24, 26, each sonar transducer 12, 14 outputs a receive electronic signal. For example, the first sonar transducer 12 may output a first receive electronic signal, and the second sonar transducer 14 may output a second receive electronic signal in response to receiving the sonar beams 24, 26. The characteristics of the receive electronic signals vary according to, or correspond to, the characteristics of the reflected sonar beams 24, 26, which vary according to, or correspond to, the surfaces and objects underwater.

The sonar display 10 may broadly comprise a display 30, a memory element 32, and a processing element 34. However, in some configurations, the sonar display 10, memory element 32, and processing element 34 may be independent of each other. For example, in various embodiments, processing element 34 may be integrated with one or more of the transducers 12, 14 to provide the functionality described herein. Similarly, functionality provided by the processing element 34 may be distributed among processors found within transducers 12, 14, and sonar display 10. That is, some functions may be performed by a portion of the processing element 34 within transducer(s) 12 and/or 14, while other functions may be performed by a portion of the processing element 34 within sonar display 10.

The sonar display 10 may further comprise electronic circuitry such as wireless communication components, signal processing components, amplifiers, filters, analog to digital converters (ADCs), digital to analog converters (DACs), and the like, which will not be discussed in detail in this document. In addition, the sonar display 10 includes a housing which retains the previously-listed components. Furthermore, the sonar display 10 may include a plurality of pushbuttons, knobs, switches, or the like, that are mounted on one or more of the walls of the housing and act as a user interface. The user interface allows the user to control the operation of the marine display 10.

The display 30 may include technology of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 30 may possess any one of a variety of shapes, such as a square or a rectangular aspect ratio that may be viewed in either a landscape or a portrait mode. In various embodiments, the display 30 may also be a touch screen that allows the user to interact with the sonar display 10 by physically touching, swiping, or gesturing on areas of the display 30. The display 30 may be in electronic communication with the memory element 32 and the processing element 34 and may receive data or information therefrom that is to be shown on the display 30. The display 30 may also receive data or information that is input by touching the display 30 and output the data or information to the memory element 32 and the processing element 34.

Figure 6:
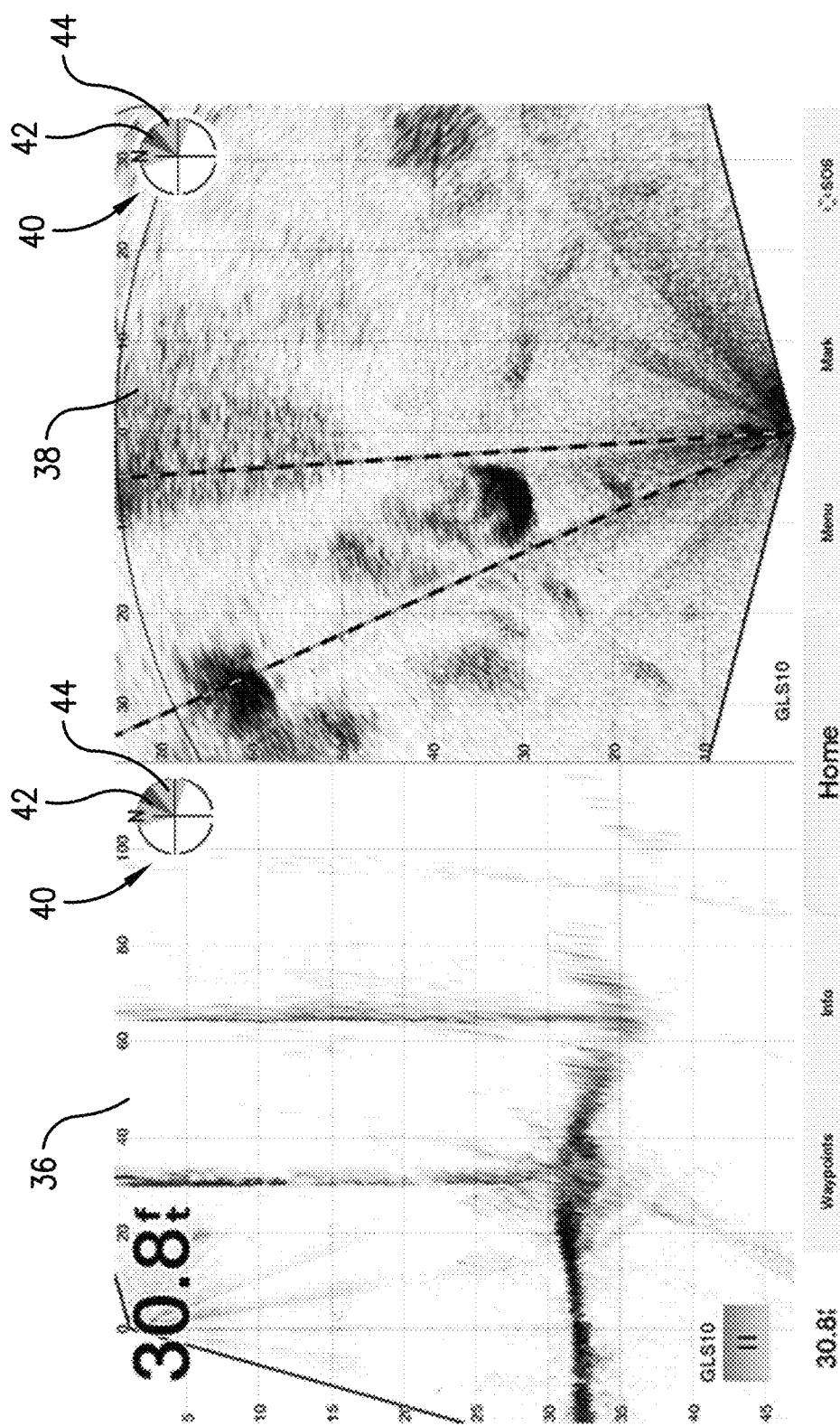
FIG. 6 is a screen capture from the sonar display illustrating a first underwater image stream and a second underwater image stream.

Referring to FIG. 6, the display 30 is configured to display a plurality of underwater image streams simultaneously or individually, with each underwater image stream being shown in one of a plurality of sections of the display 30. In one example, displays from each image stream are shown in a split screen configuration. In other examples, displays from each image stream can be separately presented and toggled between by the user to present any desired views of the image streams. For instance, transducers 12, 14 may be orientated in any desired attitude to generate desired views for presentation by display 30.

The display 30 may display a first underwater image stream 36 in a first section of the display 30 and a second underwater image stream 38 in a second section of the display 30. Each underwater image stream 36, 38 is a representation of the objects in the water and the bottom of the body of water from a particular viewpoint. For example, the first underwater image stream 36 is the forward view and is a representation of the objects in the water and the bottom of the body of water as seen from a view point to the side of the marine vessel 22 looking back at the marine vessel 22 wherein forward of the marine vessel 22 is to the right side of the image and rearward is to the left side of the image. The second underwater image stream 38 is the perspective view and is a representation of the objects in the water as seen from a view point at the surface of the water looking downward into the water wherein forward of the marine vessel 22 is to the top of the image and rearward is to the bottom of the image.

The underwater image streams 36, 38 are generated from the reflections of the sonar beams 24, 26, such that the first underwater image stream 36 is generated from the reflections of the first sonar beam 24, and the second underwater image stream 38 is generated from the reflections of the second sonar beam 26. Thus, each underwater image stream 36, 38 may include an indication of the extents of the sonar beam 24, 26 from which it is generated. For example, the first underwater image stream 36 includes bold lines to indicate the edges of the beam arc of the first sonar beam 24, wherein an origin of the first sonar beam 24 is shown near the upper left corner of the first underwater image stream 36. The second underwater image stream 38 includes bold lines to indicate the edges of the beam arc of the second sonar beam 26, wherein an origin of the second sonar beam 26 is shown near the lower center of the second underwater image stream 38. In addition, each underwater image stream 36, 38 includes a numbered XY grid. In the first underwater image stream 36, the spaced-apart lines along the X-axis indicate a distance forward and rearward in the water with the numbers indicating the distance values in units of feet. The spaced-apart lines along the Y-axis indicate a distance downward and upward in the water with the numbers indicating the distance values in units of feet. In the first underwater image stream 36, the spaced-apart lines along the X-axis indicate a distance left and right (to port and to starboard) in the water with the numbers indicating the distance values in units of feet. The spaced-apart lines along the Y-axis indicate a distance forward and rearward in the water with the numbers indicating the distance values in units of feet.

When the sonar system 20 includes the first sonar transducer 12 and the second sonar transducer 14 oriented to provide the forward view and the perspective view, respectively, the second sonar beam 26 may overlap the first sonar beam 24. In such an embodiment, the display 30 is also configured to display an indication, or marker, of the relative rotation angle, or position, of the first sonar beam 24 relative to the second sonar beam 26. Specifically, the indication, or marker, may includes lines, that are dashed (as shown in FIG. 6), bold, or of a certain color, drawn along the edges of the beam width of the first sonar beam 24 on the second underwater image stream 38. Such indications enable the user to easily perceive the relative beam coverage of each transducer.

The display 30 is further configured to show a pictogram 40 that includes a polar plot of representations of the first sonar beam 24 and the second sonar beam 26. The axes of the polar plot are the geographic north-south axis and the geographic east-west axis. The origin of the polar plot is the location of the first sonar transducer 12 and the second sonar transducer 14. The pictogram 40 includes a first wedge icon 42 representing the first sonar beam 24 being generated from the origin and a second wedge icon 44 representing the second sonar beam 26 also being generated from the origin. The first wedge icon 42 has the same shape and relative dimensions as the first sonar beam 24, and the second wedge icon 44 has the same shape and relative dimensions as the second sonar beam 26. The first wedge icon 42 is or positioned within the second wedge icon 44 at the same relative rotation angle as the first sonar beam 24 is to the second sonar beam 26. In addition, the first wedge icon 42 and the second wedge icon 44 are each positioned on the polar plot at a geographic directional angle that varies according to the geographic directional angle of each of the first sonar beam 24 and the second sonar beam 26. The display 30 may include a first pictogram 40 positioned on the first underwater image stream 36 and a second pictogram 40 positioned on the second underwater image stream 38.

However, the pictogram 40 may take any form that allows the user to easily identify the relative orientation of the transducers. The pictogram 40 may be displayed independently of, and separate from, the image streams to allow the user to adjust the orientation of the transducers 12, 14 from any portion of the user interface. The pictogram 40 may use any simplified shape or graphic to indicate the coverage of each beam generated by the transducers. The display 30 may additionally be configured to show a plurality of menu icons that allow the user to control the operation of the sonar display 10 by touching the menu icons on the screen.

The memory element 32 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 32 may be embedded in, or packaged in the same package as, the processing element 34. The memory element 32 may include, or may constitute, a non-transitory "computer-readable medium". The memory element 32 may store the instructions, code, code statements, code segments, software, firmware, programs, applications, apps, services, daemons, or the like that are executed by the processing element 34. The memory element 32 may also store data that is received by the processing element 34 or the device in which the processing element 34 is implemented. The processing element 34 may further store data or intermediate results generated during processing, calculations, and/or computations as well as data or final results after processing, calculations, and/or computations. In addition, the memory element 32 may store settings, text data, documents from word processing software, spreadsheet software and other software applications, sampled audio sound files, photograph or other image data, movie data, databases, and the like.

The processing element 34 may comprise one or more processors found within transducers 12, 14, and/or sonar display 10. The processing element 34 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 34 may generally execute, process, or run instructions, code, code segments, code statements, software, firmware, programs, applications, apps, processes, services, daemons, or the like. The processing element 34 may also include hardware components such as registers, finite-state machines, sequential and combinational logic, configurable logic blocks, and other electronic circuits that can perform the functions necessary for the operation of the current invention. In certain embodiments, the processing element 34 may include multiple computational components and functional blocks that are packaged separately but function as a single unit. In some embodiments, the processing element 34 may further include multiprocessor architectures, parallel processor architectures, processor clusters, and the like, which provide high performance computing. The processing element 34 may be in electronic communication with the other electronic components of the sonar display 10 or system generally through serial or parallel links that include universal busses, address busses, data busses, control lines, and the like. In some configurations, processing element 34, or portions thereof, may be integrated in the same housing as transducers 12 and/or 14 to provide the functions described herein.

The processing element 34 may be operable, configured, or programmed to perform the following functions, processes, or methods by utilizing hardware, software, firmware, or combinations thereof. Other components, such as the memory element 32 may be utilized as well.

The processing element 34 generally controls the display 30 to show the features described above including, but not limited to, the first and second underwater image streams 36, 38, the indication of the position of the first sonar beam 24 relative to the second sonar beam 26, and the pictogram 40.

The processing element 34 outputs the transmit electronic signals to the first sonar transducer 12 and the second sonar transducer 14, which in turn, transmit the first sonar beam 24 and the second sonar beam 26, respectively.

The processing element 34 receives the first receive electronic signal from the first sonar transducer 12 and the second receive electronic signal from the second sonar transducer 14. The processing element 34 processes the receive electronic signals and generates data for underwater image streams to be displayed on the display 30. For example, the processing element 34 processes the first electronic signal and generates a first data set for the first underwater image stream 36. The processing element 34 processes the second electronic signal and generates a second data set for the second underwater image stream 38. Such processing may occur within the transducers 12, 14 themselves, the sonar display 10, and/or other portions of the system. In addition, the processing element 34 updates the data sets for the first and second underwater image streams 36, 38 in near real time as the characteristics of the receive electronic signals change as a result of changes in the reflections of the sonar beams 24, 26. Furthermore, the first and second data sets are communicated to the display 30.

The processing element 34 receives input from the user, either from the user touching the display 30 or from the user utilizing interface features such as the pushbuttons, to rotate each of the first sonar transducer 12 and the second sonar transducer 14. Generally, the first sonar transducer 12 may be rotated separately and independently from the second sonar transducer 14. The processing element 34 outputs a first transducer rotation electronic signal that is received by the first transducer rotation controller 16 and a second transducer rotation electronic signal that is received by the second transducer rotation controller 18. The processing element 34 sets the analog level or digital data value of each transducer rotation electronic signal according to the input from the user. The rotation of the sonar transducers 12, 14 also changes the rotation angles α and β of the sonar beams 24, 26, which changes the perspectives of the views of the first underwater image stream 36 and the second underwater image stream 38. Furthermore, the rotation of the first sonar transducer 12 relative to the second sonar transducer 14 also changes the indication, or marker, of the relative rotation angle, or position, of the first sonar beam 24 within the vertical space of the second sonar beam 26 on the second underwater image stream 38.

The processing element 34 may receive an electronic signal from a magnetometer or digital electronic compass whose analog electric voltage or electric current level or digital data value varies according to a geographic direction or heading of the marine vessel 22. The processing element 34 may determine the geographic direction or heading of the marine vessel 22 from the electronic signal.

The processing element 34 generates data for the pictogram 40 to be displayed on the display 30. The processing element 34 may determine the geographic direction or heading of the marine vessel 22 as mentioned above. The processing element 34 may have stored or received data that includes values for the first rotation angle α and the second rotation angle (3 of the first sonar transducer 12 and the second sonar transducer 14 respectively. In some configurations, each transducer 12, 14 may include sensors, such as a magnetometer and/or compass, that generate attitude, position, and/or heading information that may be provided to the processing element 34 to determine the relative orientation of the sonar beams for generation of the displays described herein.

Given the geographic direction or heading of the marine vessel 22 and the values for the first rotation angle α and the second rotation angle β, the processing element 34 generates the data for the geographic direction angle for the first wedge icon 42 and the second wedge icon 44 to be overlayed on the polar plot of the pictogram 40. In addition, the processing element 34 updates the data for the pictogram 40 when the first rotation angle α or the second rotation angle β changes as a result of the user rotating the first sonar transducer 12 or the second sonar transducer 14 or when the marine vessel 22 changes geographic direction or heading. The data for the pictogram 40 is communicated to the display 30.

The sonar display 10 of the current technology provides the user with a separate underwater image stream 36, 38 for each sonar beam 24, 26 that is transmitted by the sonar transducers 12, 14. The sonar display 10 also provides the user with an indication on one underwater image stream 36, 38 where the sonar beam 24, 26 is pointing from which the other underwater image stream 36, 38 is generated. For example, on an underwater image stream 36 that shows a perspective view, lines are drawn that indicate where the sonar beam 24 is pointing that outputs a forward view. This helps the user understand the relative rotation of one sonar beam 24, 26 compared with the other sonar beam 24, 26. In addition, the sonar display 10 provides a pictogram 40 which includes a first wedge icon 42 representing the first sonar beam 24 and a second wedge icon 44 representing the second sonar beam 26. The first and second wedge icons 42, 44 are positioned on a polar plot not only at the relative rotation angle of the first and second sonar beams 24, 26, but also in a geographic direction in which the first and second sonar beams 24, 26 are pointed. This helps the user understand the rotation angle in which both sonar beams 24, 26 are pointed.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A sonar display for use with a marine vessel on a body of water, the sonar display comprising:
   a processing element configured to:
   receive a first sonar electronic signal from a first sonar transducer,
   receive a second sonar electronic signal from a second sonar transducer,
   generate data for a first underwater image stream from the first sonar electronic signal, and
   generate data for a second underwater image stream from the second sonar electronic signal; and
   a display, coupled with the processing element, the display configured to show:
   at least one of the first underwater image stream and the second underwater image stream on the display, the first underwater image stream having a first view derived from reflections of a first sonar beam, the second underwater image stream having a second view derived from reflections of a second sonar beam, and
   an indication showing a position of the first sonar beam relative to the second sonar beam,
   wherein the processing element controls the display to present at least one of the first underwater image stream, the second underwater image stream, and the indication.

2. The sonar display of claim 1, wherein the indication includes a first line corresponding to a first edge of the first sonar beam and a second line corresponding to a second edge of the first sonar beam.

3. The sonar display of claim 1, wherein the second underwater image stream includes a first line corresponding to a first edge of the second sonar beam and a second line corresponding to a second edge of the second sonar beam.

4. The sonar display of claim 1, wherein the display is further configured to show a pictogram that comprises a first wedge icon corresponding to the first sonar beam and a second wedge icon corresponding to the second sonar beam and the first wedge icon is shown in a position relative to the second wedge icon corresponding to the position of the first sonar beam relative to the second sonar beam.

5. The sonar display of claim 4, wherein the pictogram further comprises a polar plot with the first wedge icon located on the polar plot at a first angle corresponding to a geographic direction of the first sonar beam and the second wedge icon located on the polar plot at a second angle corresponding to a geographic direction of the second sonar beam.

6. The sonar display of claim 1, wherein the processing element is further configured to receive input from a user and communicate an electronic signal to a first transducer rotation controller to rotate the first sonar transducer and the first sonar beam according to the input.

7. The sonar display of claim 1, wherein the first view is a forward view and the second view is a perspective view.

8. A sonar display for use with a marine vessel on a body of water, the sonar display comprising:
   a processing element configured to:
   receive a first sonar electronic signal from a first sonar transducer,
   receive a second sonar electronic signal from a second sonar transducer,
   generate data for a first underwater image stream from the first sonar electronic signal, and
   generate data for a second underwater image stream from the second sonar electronic signal; and
   a display configured to show:
   the first underwater image stream on a first portion of the display, the first underwater image stream having a first view derived from reflections of a first sonar beam,
   the second underwater image stream on a second portion of the display, the second underwater image stream having a second view derived from reflections of a second sonar beam, and
   a pictogram including a first wedge icon corresponding to the first sonar beam and a second wedge icon corresponding to the second sonar beam and the first wedge icon is shown in a position relative to the second wedge icon corresponding to the position of the first sonar beam relative to the second sonar beam,
   wherein the processing element controls the display to present at least one of the first underwater image stream, the second underwater image stream, and the pictogram.

9. The sonar display of claim 8, wherein the display is further configured to show an indication on the second underwater image stream of a position of the first sonar beam relative to the second sonar beam.

10. The sonar display of claim 9, wherein the indication includes a first line corresponding to a first edge of the first sonar beam and a second line corresponding to a second edge of the first sonar beam.

11. The sonar display of claim 8, wherein the second underwater image stream includes a first line corresponding to a first edge of the second sonar beam and a second line corresponding to a second edge of the second sonar beam.

12. The sonar display of claim 8, wherein the pictogram further comprises a polar plot with the first wedge icon located on the polar plot at a first angle corresponding to a geographic direction of the first sonar beam and the second wedge icon located on the polar plot at a second angle corresponding to a geographic direction of the second sonar beam.

13. The sonar display of claim 8, wherein the processing element is further configured and/or programmed to receive input from a user and communicate an electronic signal to a first transducer rotation controller to rotate the first sonar transducer and the first sonar beam according to the input.

14. The sonar display of claim 8, wherein the first view is a forward view and the second view is a perspective view.

15. A sonar system for use with a marine vessel on a body of water, the sonar system comprising:
   a first sonar transducer configured to transmit a first sonar beam and to output a first sonar electronic signal;
   a second sonar transducer configured to transmit a second sonar beam and to output a second sonar electronic signal; and
   a sonar display including a processing element configured to:
    receive a first sonar electronic signal from a first sonar transducer,
    receive a second sonar electronic signal from a second sonar transducer,
    generate data for a first underwater image stream from the first sonar electronic signal, and
    generate data for a second underwater image stream from the second sonar electronic signal, and
a display configured to show:
    the first underwater image stream on a first portion of the display, the first underwater image stream having a first view derived from reflections of a first sonar beam,
    the second underwater image stream on a second portion of the display, the second underwater image stream having a second view derived from reflections of a second sonar beam, and
    an indication on the second underwater image stream of a position of the first sonar beam relative to the second sonar beam,
    wherein the processing element controls the display to present at least one of the first underwater image stream, the second underwater image stream, and the indication.

16. The sonar system of claim 15, wherein the indication includes a first line corresponding to a first edge of the first sonar beam and a second line corresponding to a second edge of the first sonar beam.

17. The sonar system of claim 15, wherein the second underwater image stream includes a first line corresponding to a first edge of the second sonar beam and a second line corresponding to a second edge of the second sonar beam.

18. The sonar system of claim 15, wherein the display is further configured to show a pictogram that comprises
    a polar plot,
    a first wedge icon corresponding to the first sonar beam and located on the polar plot at a first angle corresponding to a geographic direction of the first sonar beam, and
    a second wedge icon corresponding to the second sonar beam and located on the polar plot at a second angle corresponding to a geographic direction of the second sonar beam,
    and wherein the first wedge icon is shown in a position relative to the second wedge icon corresponding to the position of the first sonar beam relative to the second sonar beam.

19. The sonar system of claim 15, wherein the processing element is further configured and/or programmed to receive input from a user and communicate an electronic signal to a first transducer rotation controller to rotate the first sonar transducer and the first sonar beam according to the input.

20. The sonar system of claim 15, wherein the first view is a forward view and the second view is a perspective view.

* * * * *